INVENTOR.
E.W. TURNER
BY Young and Quigg
ATTORNEYS

INVENTOR.
E.W. TURNER

# United States Patent Office 3,427,375
Patented Feb. 11, 1969

3,427,375
EXTERNAL AND INTERNAL FALLING WATER
FILM QUENCH OF POLYMER TUBING
Edward W. Turner, Hazardville, Conn., assignor to
Phillips Petroleum Company, a corporation of
Delaware
Continuation of application Ser. No. 396,115, Sept. 14,
1964. This application Dec. 18, 1967, Ser. No. 695,819
U.S. Cl. 264—95                                 6 Claims
Int. Cl. B29f 3/08

ABSTRACT OF THE DISCLOSURE

A tube, suitabel for use as a parison in blow molding transparent articles, is extruded downwardly through a cooled sizing sleve and over a cooled internal sizing plug and is then contacted with internal and external solid falling films of water so as to maintain the surface quenched until the entire wall thickness of the tube is cooled to below the crystalline melt point.

---

This is a continuation application of my copending application Ser. No. 396,115, filed Sept. 14, 1964, now abandoned.

This invention relates to the production of transparent polymer containers. In one aspect the invention relates to a method for maintaining transparency of a thermoplastic polymer when it is blow molded to form a biaxially oriented container such as a bottle. In another aspect it relates to an apparatus for carrying the method of the invention into effect. In still another aspect it relates to a method and means for cooling and quenching an extruded parison of a linear polymer so that the parison maintains its transparency when subjected to a subsequent blow molding operation.

The production of linear polymers in large quantities has resulted in a great increase in the number of containers and other hollow articles fabricated from thermoplastic materials. These hollow articles include bottles and similar articles having a single, relatively small opening therein. These articles are usually formed by a blow molding technique similar to that employed in the manufacture of glass bottles.

More recently linear polymers have been produced which can be formed into substantially tarnsparent films of sufficient thickness to be used in forming bottles. Transparency in bottles is a very desirable quality and therefore efforts have been directed to blow molding transparent bottles from such polymers. Linear polypropylene is presently the polymer that posesses most of the desirable qualities of strength, flexibility, age resistance, transparency, availabilty and low price. The invention is also applicable to other linear polymers which can be made transparent. A method for producing linear polypropylene and other linear polymers is disclosed and claimed in U.S. 2,825,721 issued Mar. 4, 1958, to J. P. Hogan et al.

Conventional blow molding techniques heretofore utilized in producing hollow articles from thermoplastic polymers have not been satisfactory for producing transparent, oriented hollow articles, such as bottles, from linear polymers such as polypropylene because the articles so produced have been cloudy to opaque with rough, non-uniform surfaces. Extruding the parison directly into a mold followed by blow molding produces a rough textured article that is nearly opaque. It is believed that the slow cooling from the melt results in formation of large crystallites. Rapid cooling of the parison followed immediately by blow molding produces transparent articles but often results in rupture of the parison during the blowing step.

I have found that transparent, oriented, blow molded linear polymer containers can be produced by forming a parison tube from the polymer melt with smooth inner and outer surfaces and then rapidly quenching both surfaces of the unoriented tube with a continuous, solid film of flowing water. The cooled parison can then be heated and blow molded to produce a smooth, transparent article. A "continuous, solid film of flowing water" is more fully described as a continuous flow of water applied to the entire external and/or internal periphery of the tube as distinguished from a spray of water or a flow of water that is broken up into droplets or separate streams. Thus, the water is applied from a circular opening so as to produce a solid sheet of water which converges upon the exterior surface of the tube and from a circular opening so as to produce a solid sheet of water which diverges upon the interior surface of the tube. I have found that this method of producing parisons provides a parison having a smooth surface that is retained during the blow molding operation. It is necessary to impart smooth inner and outer surfaces of the tube as it is cooled to near the crystalline freeze temperature and then it is necessary to quench these surfaces as well as the interior mass of the polymer rapidly to a temperature below the crystalline freeze point of the polymer without adversely affecting the smooth surface. The smooth surface is imparted by passing the extrudate over a smoothing device while the extrudate is at a temperature slightly above the crystalline freeze point of the polymer. The surface of the tube should be in the viscous molten state when the surface is simultaneosuly smoothed and quenched so the smooth surface is maintained while the inner mass of ploymer of the tube is being cooled to below the crystalline freeze temperature. The crystalline freeze temperature of polypropylene and polyethylene is about 252° F. and therefore the surface is smoothed at a temperature of about 260° F. and simultaneously quenched to below 252° F. The is maintained while the inner mass of polymer of the molten state for polyethylene is above 275° F. and for polypropylene is above 334° F.; the rigid or crystalline state for both polyethylene and polypropylene is below 252° F. Upon cooling the molten polymer the polymer stays in the amorphous state but its viscosity increases with lowering temperature until the temperature of 252° F. is reached; then freezing or crystallization occurs quite rapidly with continued lowering of temperature. When the temperature of the polymer is increased from a temperature below 252° F., the viscosity of the polymer decreases gradually as the polymer crystals disappear until the molten or fluid state for the polymer is reached. The term "fluid" is defined as the state at which the polymer can be molded, for example, by injection molding. The term "softened state" is defined as the state of polymer which is sufficiently plastic so as to be molded, for example by blow molding or compression molding, and can be in the amorphous state upon cooling from the molten state to the crystalline state; or can be in the partial crystalline state upon being heated from the crystalline state to the molten state. According to the present invention the extruded tube is caused to pass through a cooled sizing sleeve having a smooth inner surface and then over a cooled internal sizing plug or ring having a smooth outer surface so that each smoothed tube surface is also quenched. Substantially immediately after it has passed over the smoothing member, each of the inner and outer surfaces is contacted with a continuous solid film of flowing water. The extrudate, which is in the form of a polymer tube, is extruded downwardly so that the solid film of water falls downwardly in contact with the surface of the tube and continues to extract heat from the polymer tube so that the smooth surface imparted by the smoothing devices is maintained. I have found that a spray of water directed on the surface of the extrudate will not maintain this smooth surface but instead imparts a mottled and pitted surface to the extrudate. It is believed that the solid film of water flowing downwardly over the extrudate prevents the formation of steam or bubbles which, in prior art practice, tend to attach themselves to the extrudate surface and the solid film of flowing water provides uniform cooling of the extrudate surface around its entire periphery so that surface imperfections which result from nonuniform cooling are avoided. It is also believed that practice of the present invention increases crystal growth rate so as to promote clarity in the extruded tube and this crystal growth pattern is not affected during theb low molding operation. I have found that the parisons made according to the invention maintain their clarity when heated and blow molded wherein the polymer is biaxially oriented in the molding operation.

It is an object of this invention to provide a method and means for producing transparent, hollow articles from linear thermoplastic polymers. It is also an object of this invention to provide a method and means for cooling an extrudate so as to preserve the surface of the extrudate imparted by the extruding device. Other and further objects and advantages of this invention will be apparent to one skilled in the art upon study of this disclosure including the detailed description of the invention and the drawing wherein.

Figures 1, 2:
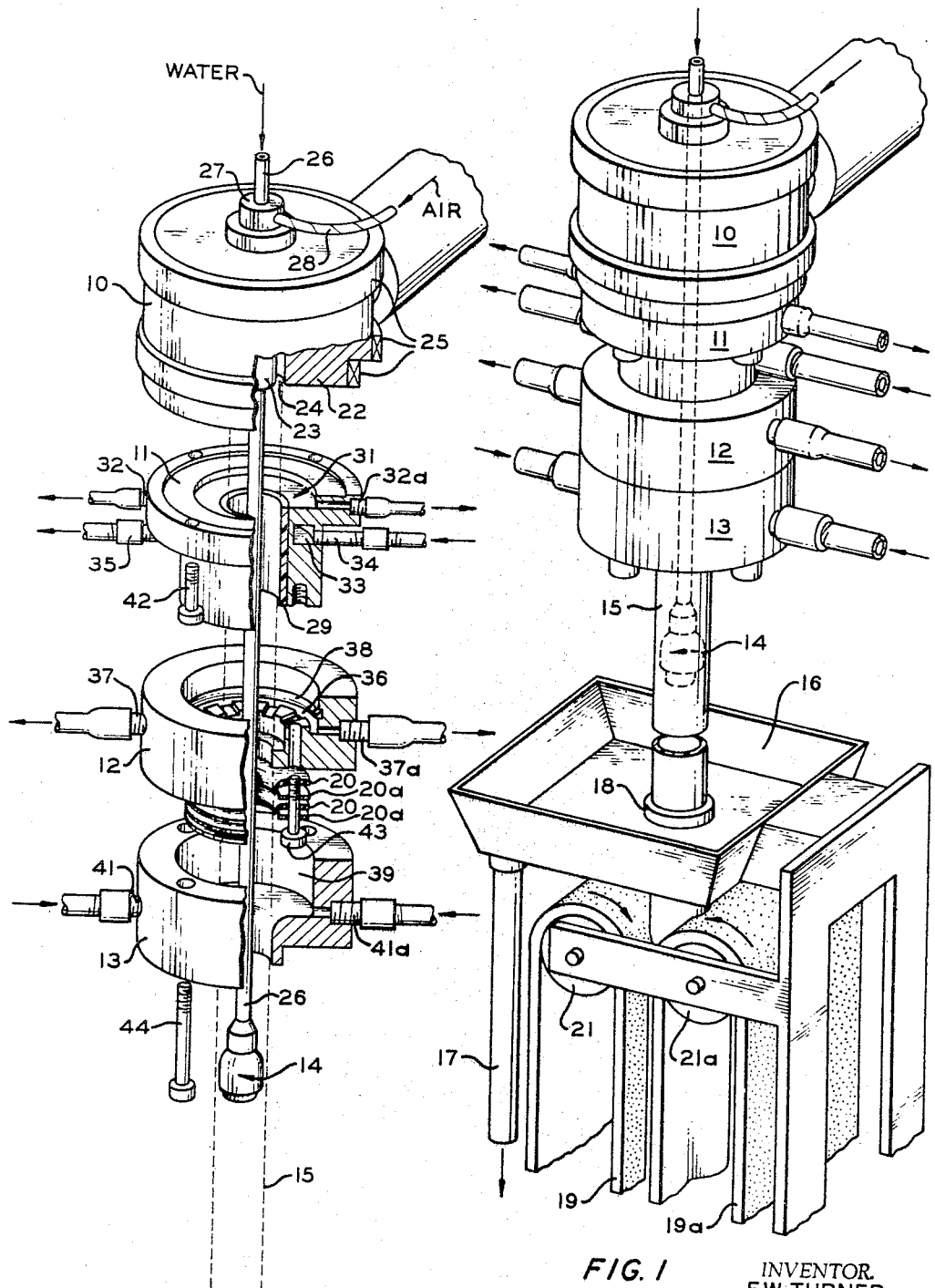
FIGURE 1 is an elevational view of a preferred apparatus for carrying out the process of this invention.
FIGURE 2 is an exploded view, partly in section, of the principal elements of FIGURE 1.

Referring now to FIGURE 1, there is shown an extrusion device according to the invention comprising an extrusion crosshead die 10, an upper vacuum ring 11, lower vacuum ring 12, external water ring 13 and internal water and sizing ring 14, producing an extruded polymer tube 15 that is subsequently cut into parisons by conventional means (not shown). The falling film of water applied by external water ring 13 is collected in a pan 16 and removed by a conduit 17. A soft, resilient gasket 18 acts as a seal between the tube 15 and the pan 16. The foam rubber-covered moving belts 19 and 19a pass over the hard rubber rollers 21 and 21a and pull the extruded tube 15 downwardly at a controlled rate. The extruder crosshead die is connected to a conventional polymer extruder (not shown). The falling water film from the internal water ring is discharged into a trench or hopper associated with the conventional tube cutting device (not shown).

FIGURE 2 shows the crosshead die 10 comprising the die member 22, die mandrel 23 and die opening 24. The die member is maintained at the proper temperature by the peripheral band heaters 25. Internal water and sizing ring 14 is secured to the end of tube 26 which passes downwardly through die mandrel 23. Tube 26 is secured in position by cap member 27 positioned on top of crosshead die 10. Air or other pressure fluid is admitted to the interior of the tubing 15 via conduit 28 and cap 27 to the annulus between die mandrel 23 and tube 26.

Upper vacuum ring 11 has positioned therein sizing sleeve 29 which is made of a suitable material such as aluminum coated with polytetrafluoroethylene and having a smooth, polished inner polytetrafluoroethylene surface. A vacuum can be applied to the chamber 31 via outlets 32 and 32a. Cooling fluid is passed to the chamber 33 via inlet 34 and is removed via outlet 35. Vacuum can be applied to the chamber 36 of lower vacuum ring 12 via outlets 37 and 37a. Normally vacuum is applied only during start-up of the operation. Resilinet gasket 38 provides a seal between the upper vacuum ring 11 and the lower vacuum ring 12. A seal is indicated at this point since these are sliding surfaces. A similar seal can be provided if desired between the crosshead die 10 and the upper vacuum ring 11; however, the contact at this point is a compression junction of a small surface area and a gasket is ordinarily not required.

Cooling water is supplied to chamber 39 of external water ring 13 via inlets 41 and 41a.

Seal rings 20 wipe the exterior of the tube 15 and provide a seal between water chamber 39 of external water ring 13 and vacuum chamber 36 of the lower vacuum ring 12. The seal rings are positioned by metal retainer rings 20a. The seal rings 20 can be made from any suitable material such as polytetrafluoroethylene, neoprene synthetic rubber and the like.

Upper vacuum ring 11 is secured to crosshead die 10 by bolts 42; lower vacuum ring 12 is secured to upper vacuum ring 11 by bolts 43; and external water ring 13 is secured to lower vacuum ring 12 by bolts 44.

Figure 3:
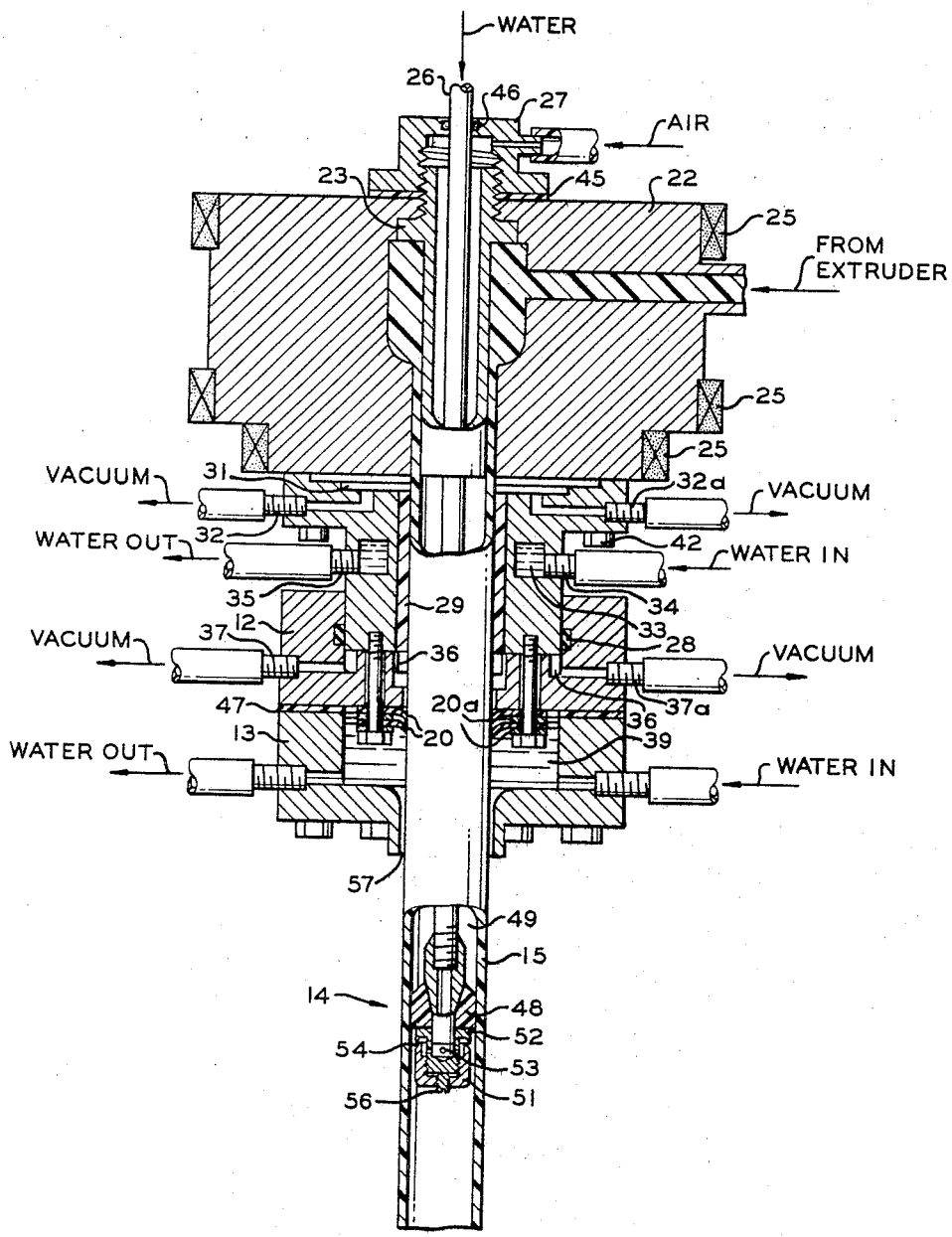
FIGURE 3 is an elevation, in section, of the assembled elements of FIGURE 2.

FIGURE 3 shows the relationship of the elements described in FIGURES 1 and 2 in their assembled form. As shown in FIGURE 3, the cap 27 secures the die mandrel 23 in position in the die 22 and gasket 45 provides a seal between cap 27 and die 22. Gasket 46 provides a seal between cap 27 and tube 26 and also provides a means for maintaining internal water and sizing ring 14 in position. A gasket 47 provides a seal between external water ring 13 and lower vacuum ring 12.

Internal sizing and water ring 14 comprises a polished ring 48 made of suitable material such as aluminum coated with polytetrafluoroethylene and imparts a smooth surface to the interior of the tube 15 and also provides a seal for the annulus 49 between tube 26 and tube 15 so that a predetermined internal pressure can be maintained on the tube 15 above the internal water and sizing ring 14. The internal water ring element of the internal water and sizing ring 14 comprises a cup-shaped member 51 secured to plug member 52 having outlets 53 therein so as to provide an annular opening 54 which directs a continuous sheet or film of water against the interior of the tube 15 directly downstream from the Teflon-coated ring 48. The area of the annular ring 54 can be changed by manipulation of the set screw 56 and cup-shaped member 51.

Water passes from chamber 39 of external water ring 13 through the annulus 57 in the form of a continuous sheet or film of water around the entire external periphery of the tube 15.

The smoothing ring 48 and the sizing sleeve 29 (FIGURE 3) are made of metal and coated with polytetrafluoroethylene and are water cooled to avoid sticking.

Figure 4:
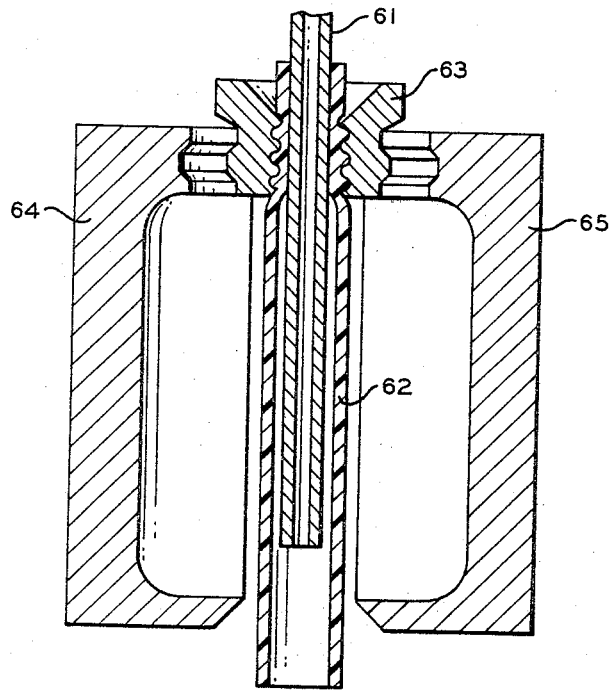
FIGURE 4 is an elevation, in section, of a blow molding device in open position with the parison in place.

In FIGURE 4 there is illustrated one method for utilizing the parisons made in the device of FIGURES 1, 2 and 3. The parisons which comprise sections cut from tube 15 are placed over a mandrel 61. The parison 62 on the mandrel 61 is heated to the softened state of the polymer and a neckpiece 63 is secured about the upper portion of the parison 62 at molding pressure so as to cause the softened parison to conform to the interior configuration of the neckpiece. The neckpiece also serves as a means for handling the parison and mandrel. The parison, mandrel and neckpiece are placed in position in the open mold comprised of mold half 64 and mold half 65 and the mold is then closed by known means (not shown) to assume the position shown in FIGURE 5.

Figure 5:
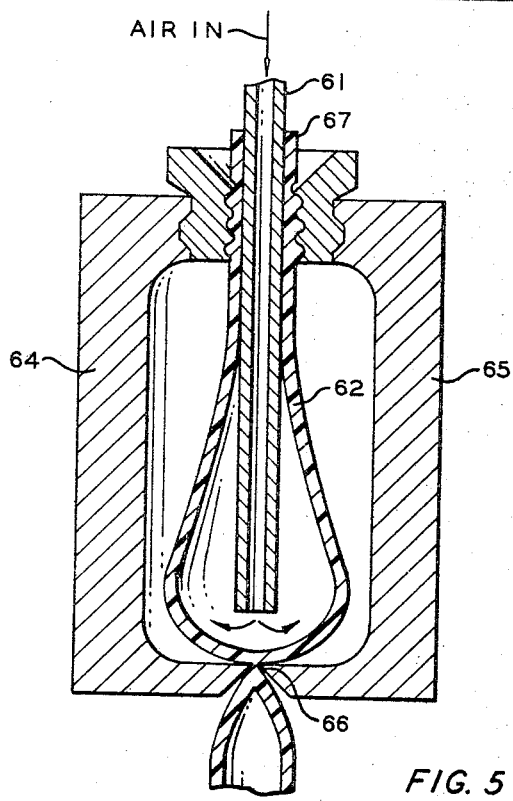
FIGURE 5 is an elevation, in section, of the mold of FIGURE 4 closed.

When the mold is closed, as shown in FIGURE 5, the bottom of the parison is pinched off as indicated at 66, forming a seal at the bottom of the parison and air is then admitted into the mandrel 61 so as to blow the parison 62 against the sides 64 and 65 of the mold. The portion of the parison 67 is also pinched off by closing the mold. The molding operation is conventional and can be accomplished in any desired manner. Trimming is sometimes necessary if the pinching operation does not sever the excess material cleanly.

The operation of the apparatus of the invention in the practice of the process of the invention will now be described with respect to the fabrication of tubing from polypropylene produced by the Hercules Powder Company and identified as Hercules 6513 F polypropylene. The extruder connected to the crosshead die 10 of the drawing was equipped with a 1½-inch diameter extruder screw. The tubing was extruded and was cut into 3 to 4 foot lengths. The tubing produced at puller speed of 4.7 feet per minute had a wall thickness of 77 to 79 mils and an outside oval diameter of 851 by 854 mils; and at puller speed of 4.4 feet per minute had a wall thickness of 86 mils and an outside oval diameter of 851 by 861 mils. Tap water at the rate of about 24 gallons per hour was passed as a continuous falling water film over the exterior of the tubing as the tubing was removed from the sizing rings. Tap water at the rate of about 60 gallons per hour was passed as a continuous falling water film over the interior of the tubing at 1¼ inches below the exterior falling water film from exterior water ring 13. Tap water at the rate of about 60 gallons per hour was circulated into and out of the water chamber 33 in sizing sleeve 29 to cool the polymer tube surface to below 252° F. The annulus 57 was 1/32 inch from the tubing wall to the external water ring 13 wall.

Vacuum was applied to ports 32, 32a, 37 and 37a during start-up of the process to hold the tubing out against the sizing sleeve 29 until the tubing was passed over internal sizing and water ring 14. After the tubing was passed over the internal sizing ring or plug, air pressure at about 2 p.s.i. was then introduced via port 28 to the interior of the tubing and the vacuum was discontinued.

The polymer was extruded at about 390° F. and sufficient water was passed through the water jacket 33 and over the internal and external surfaces of the tubing to reduce the polymer temperature to below 252° F., the crystalline freeze temperature of the polymer.

During the entire run the tubing was sufficiently clear that everything inside the tube could be easily observed. It was noted that there was a slight build-up of softened polymer at the internal polished polytetrafluoroethylene-coated ring 48 with the polymer sliding over the ring to produce a uniform inside diameter (I.D.) of the tubing. It was also noted that the amount of build-up varied from time to time but the dimensions of the tubing remained substantially constant. It was found that the tube-forming apparatus of the invention is very insensitive to variations in operation and even to minor upsets in the operation because of the ability of the ring 48 to suffer an appreciable build-up of polymer without preventing the puller from pulling the tubing over ring 48 and without pulling tubing 15 apart.

Polypropylene tubing from the above run was cut into 8½-inch lengths and used as parisons in a 10-ounce bottle mold such as that shown in FIGURES 4 and 5. The parisons were heated for at least 3 minutes in ethylene glycol at 322–323° F. and then placed in the mold and blown. The bottles had a wall thickness of 13 and 16 mils and possessed remarkable clarity. The clarity of the bottles was superior to any bottles produced from previously produced parisons.

The crystalline melt temperature of polypropylene is about 330° F. and the crystalline freeze temperature is about 252° F.

The clarity of other linear polymers is improved when tubes are extruded according to the process of this invention and with the apparatus of this invention. Thus polyethylene tubing made according to the present invention will be semi-transparent to translucent depending on the thickness of the tube and quality of the polyethylene.

That which is claimed is:

1. The method of making parisons for blow molding into substantially transparent, biaxially oriented containers of a crystalline, thermoplastic polymer which comprises extruding a tube, suitable for use as a parison in blow molding transparent articles, of the polymer downwardly through a cooled exterior sizing sleeve and then over a cooled interior sizing plug so as to quench and smooth the surface of the tube simultaneously; without cooling the entire wall thickness of the tube below its crystalline freeze temperature; applying fluid pressure to the interior of the tube sufficient to prevent shrinkage of the tube from the sleeve; contacting the exterior of the tube substantially immediately after the tube emerges from the sleeve with a continuous falling solid film of water in an amount sufficient to maintain the exterior surface of the polymer of the tube below its crystalline freeze temperature until the entire wall thickness of the tube is below its crystalline freeze temperature; then contacting the interior of the tube substantially immediately after the tube has passed over the internal sizing plug with a continuous falling solid film of water in an amount sufficient to maintain the interior surface of the polymer of the tube below its crystalline freeze temperature until the entire wall thickness of the tube is below its crystalline freeze temperature; and recovering a substantially transparent polymer tube having smooth internal and external surfaces suitable for cutting into parisons for blow molding.

2. The process of fabricating tubing suitable for use as a parison for blow molding into substantially transparent, biaxially oriented containers from linear polypropylene wherein molten linear polypropylene is extruded downwardly in the form of a tube comprising quenching and simultaneously smoothing the external surface of the molten polypropylene tube to below the crystalline freeze temperature and then quenching and simultaneously smoothing the internal surface of the tube to below the crystalline freeze temperature without cooling the entire wall thickness of the tube below its crystalline freeze temperature; and contacting the smoothed internal and external surfaces of the tube with a continuous, solid film of falling water in an amount sufficient to maintain the surface of the polypropylene of the tube at a temperature below the crystalline freeze temperature of the polypropylene until the entire wall thickness of the tube is below its crystalline freeze temperature so as to produce a substantially transparent polypropylene tube suitable for use as a parison in blow molding transparent articles.

3. The process of claim 2 wherein the polypropylene is extruded at about 390° F.; quenched to below 252° F. while smoothing the inside and outside surfaces of the extruded tube; and maintained at a temperature below 252° F. by the falling film of water.

4. Apparatus for extruding transparent polymer tubing suitable for use as a parison for blow molding into substantially transparent, biaxially oriented containers which comprises in combination means to extrude a polymer melt downwardly in the form of a tube; a sizing sleeve positioned downstream with respect to the flow of polymer melt from said means to extrude polymer melt to size and smooth the external surface of said tube while cooling the external surface of said tube to about the crystalline freeze temperature of the polymer; means to urge the tube into contact with the sizing sleeve; means to contact the smooth exterior surface of the tube below the sizing sleeve with a continuous solid film of falling water; a sizing plug positioned in said tube downstream from the entry of said polymer to said sizing sleeve to size and smooth the internal surface of the tube and to seal the pressure in the tube above the sizing plug; and means to contact the smooth interior surface of the tube below the sizing plug with a continuous solid film of falling water.

5. Apparatus for extruding thermoplastic tubes suitable for use as a parison for blow molding into substantially transparent, biaxially oriented containers which comprises in combination: means to extrude a plastic melt downwardly in the form of a tube; an outer smoothing device positioned downstream with respect to the flow of polymer melt from said means to extrude polymer melt, to cool the outer surface of the molten tube to a plastic state and simultaneously to impart a smooth surface to the exterior of the extruded tube; an inner smoothing device positioned downstream from said outer smoothing device, to cool the inner surface of the molten tube to a plastic state and simultaneously to impart a smooth surface to the interior of the extruded tube; and means to contact the entire surface of the thus smoothed tube with a solid, continuous film of flowing water in an amount sufficient to maintain the surface of the tube at a temperature below the crystalline freeze temperature of the polymer.

6. The apparatus according to claim 5 wherein said means to contact the surface of the tube with the solid, continuous film of flowing water comprises a water chamber surrounding the tube downstream from said outer smoothing device having an opening in the bottom of the chamber of larger diameter than that of the tube to provide an annulus between the wall of the tube and said chamber to provide an outlet for the water; means to supply water to said chamber; a conduit positioned in the center of the extruded tube, said conduit carrying said inner smoothing device; an annular water outlet operatively connected to said conduit below said inner smoothing device adapted to direct a continuous sheet of water against the internal surface of the extruded tube immediately below said smoothing device; and means to supply water to said conduit.

References Cited
UNITED STATES PATENTS

| | | |
|---|---|---|
| 3,090,998 | 5/1963 | Heisterkamp et al. |
| 3,108,324 | 10/1963 | Zavashik. |
| 3,193,547 | 7/1965 | Schott. |
| 3,207,823 | 9/1965 | Glyde et al. |

FOREIGN PATENTS

| | | |
|---|---|---|
| 783,449 | 9/1957 | Great Britain. |

ROBERT F. WHITE, *Primary Examiner.*

A. R. NOE, *Assistant Examiner.*

U.S. Cl. X.R.

18—14; 264—99, 209